US007055428B2

(12) United States Patent
Schaschek et al.

(10) Patent No.: US 7,055,428 B2
(45) Date of Patent: Jun. 6, 2006

(54) CHARACTERIZATION, DETERMINATION OF A CHARACTERISTIC NUMBER AND SELECTION OF SUITABLE DRESSINGS ON CYLINDERS OF A PRINTING PRESS

(75) Inventors: Karl Erich Albert Schaschek, Thüngen (DE); Ralf Christel, Aschbach (DE); Oliver Frank Hahn, Veitshöchheim (DE); Bernd Kurt Masuch, Kümach (DE); Kurt Johannes Weschenfelder, Zell/Main (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 81 days.

(21) Appl. No.: 10/398,506

(22) PCT Filed: Aug. 28, 2002

(86) PCT No.: PCT/DE02/03142

§ 371 (c)(1), (2), (4) Date: Apr. 23, 2004

(87) PCT Pub. No.: WO03/086760

PCT Pub. Date: Oct. 23, 2003

(65) Prior Publication Data

US 2004/0168594 A1 Sep. 2, 2004

Related U.S. Application Data

(60) Provisional application No. 60/371,411, filed on Apr. 11, 2002.

(51) Int. Cl.
*B41F 13/10* (2006.01)
*B32B 7/02* (2006.01)

(52) U.S. Cl. ...................... 101/376; 101/375; 428/218

(58) Field of Classification Search ............ 101/401.1, 101/475, 376, 228, 375, 217, 142; 428/218, 428/141, 217, 213, 47, 422, 212; 442/224, 442/246, 250, 221, 257
See application file for complete search history.

(56) References Cited

U.S. PATENT DOCUMENTS 4,042,743 A * 8/1977 Larson et al. ............... 442/224
5,431,989 A 7/1995 Beltzung et al. ............ 428/218

(Continued)

FOREIGN PATENT DOCUMENTS

DE 43 15 456 A1 11/1993
EP 0 448 469 A1 9/1991

OTHER PUBLICATIONS

The Effect of Printing Blankets on the Rolling Condition of Printing Cylinders; Schaschek et al. Taga Proceedings 2001; p. 211; Apr. 2001.

*Primary Examiner*—Daniel J. Colilla
*Assistant Examiner*—Wasseem H. Hamdan
(74) *Attorney, Agent, or Firm*—Jones Tullar & Cooper PC

(57) ABSTRACT

A characterizing number for a cylinder dressing having an elastic layer is determined. The characterizing number is then usable to select suitable geometries of rollers in a printing press. If the roller geometry is already known, the characterizing number facilitates the selection of a suitable dressing. The characterizing number characterizes the roll-off behavior of a dressing independently of a measuring device used to determine the number or an application in a particular printing group.

5 Claims, 6 Drawing Sheets

U.S. PATENT DOCUMENTS

| | | | | |
|---|---|---|---|---|
| 5,860,360 | A * | 1/1999 | Lane et al. | 101/376 |
| 6,182,568 | B1 * | 2/2001 | Ogita et al. | 101/376 |
| 6,640,711 | B1 * | 11/2003 | Smoot et al. | 101/375 |
| 6,782,820 | B1 * | 8/2004 | Okubo et al. | 101/375 |

* cited by examiner

CHARACTERIZATION, DETERMINATION OF A CHARACTERISTIC NUMBER AND SELECTION OF SUITABLE DRESSINGS ON CYLINDERS OF A PRINTING PRESS

CROSS-REFERENCE TO RELATED APPLICATIONS

The application is a filing under 35 U.S.C. 371 of PCT/DE02/03142 filed Aug. 28, 2002, which claims the benefit of U.S. Provisional Application No. 60/371,411, filed Apr. 11, 2002, which is incorporated herein by reference.

FIELD OF THE INVENTION

The present invention is directed to a method for characterization, to a method and to a device for determining a characteristic number, as well as to methods for selecting suitable dressings on rollers, or suitable geometries of rollers of a printing press.

BACKGROUND OF THE INVENTION

In printing presses, and in particular in rotary printing presses, ink is applied between one or several rollers of an ink unit, between the ink unit and printing group cylinders, possibly between printing group cylinders, and from one printing group cylinder against a counter-pressure cylinder, all of which are referred to as rollers in the following discussion, and to a web, for example a paper web. To this end, the transfer of the ink between two adjoining rollers, which typically cooperate with each other through the web, preferably takes place between a first roller with a "hard" surface and a second roller with a "soft" surface.

Since a certain amount of surface pressure between the rollers is required for transferring the ink, at least the surface of the roller with the soft surface undergoes a deformation in the area of its contact with the hard surfaced roller. This deformation of the soft surface which is structured, for example, as an elastomer dressing, a rubber blanket, a metallic print blanket, sleeve, or coating causes a change in the effective diameter of this roller, with this change depending on the material behavior and the size of a compression, for example as a function of the distance between the rollers, the different thicknesses of the web, etc. In the course of the soft surface roller's rolling off on the cooperating hard roller, this surface deformation leads to changes in the surface pressure and in the roll-off. With rollers which are driven mechanically or which are electronically synchronized, this can lead to different surface velocities as a function of the material used and of the compression, and therefore to slippage in the nip defined as the area of contact between the two rollers.

The slippage generated in this manner results in a tangential force component because of friction, and therefore a reduced print quality which may be due to pushing or blurring, interference with the transfer of power, as well as a reduced service life of printing formes, or dressings.

A print blanket is known from DE 43 15 456 A1, which has an incompressible or dimensionally stabilized carrier layer and a compressible elastomeric layer, wherein the latter increases the tolerances in the printing roll-off. With the use of an optimized layer structure, it can be achieved that in certain contact areas of the cooperating cylinders almost no change in the length of the surfaces occurs. This means that a difference in the angles of rotation of two cylinders rolling off on each other is independent of the compression in these areas. It is possible to determine the difference in the angles of rotation for different dressings and for different contacts by use of a laboratory model, wherein a driven first cylinder and a cylinder which freely runs along and is provided with the dressing, are placed against each other.

A characterizing number for characterizing the roll-off behavior of an elastic dressing is discussed in an article published by the inventors of the subject invention and starting at page 211 of the TAGA Proceedings 2001, and which is entitled "The Effect of Printing Blankets on the Rolling Condition of Printing Cylinders". This makes it possible for a designer to calculate the transmission ratios between transfer and forme cylinders. A device for determining the roll-off behavior has an externally driven and a friction-driven roller, whose angular velocities can be measured by use of opto-electronic angle decoders.

SUMMARY OF THE INVENTION

The object of the present invention is directed to providing a method for characterization, to providing a method and a device for determining a characteristic number, as well as to methods for selecting suitable dressings on rollers, or suitable geometries of rollers of a printing press.

The advantages which can be obtained by the present invention reside, in particular, in that a quantitative description of the dressings in respect to their conveying, or roll-off behavior is made possible, and that the characterization created in this way is independent of the geometry of a measuring device, as well as being independent of the geometry of a print unit. The characteristic number used for characterizing the dressing is corrected for the specific geometries and can be alternatingly used with a measuring device or the print unit. The description is no longer purely qualitatively usable, for example positively conveying, negatively conveying, but is also quantitatively usable.

By use of the method for characterizing a dressing by the use of a characteristic number in accordance with the present invention, an unequivocably defined language for the producer of dressings and the designer of the printing press is created which, on the one hand, permits a tailor-made construction of the printing press in connection with a desired, pre-selected dressing, and on the other hand facilitates a definite selection of a dressing for a pre-selected configuration of a printing press. Both can already be clarified at the outset, so that an expensive test program, which otherwise must be performed at the printing press for the special configuration and for each type of dressing, can be omitted.

It is therefore an advantageous solution to select a dressing for a given pair of cylinders in such a way that, in the course of a compression of the dressing, because of an incompressible component, the dressing is extended to such a degree that the reduced distance to the center of rotation of the cylinder supporting the dressing is compensated. Such a requirement can be determined by utilization of the method in accordance with the present invention, and an appropriate dressing can be selected.

In an alternate approach, it is therefore advantageous to select the geometry of the printing group for a special, given dressing in such a way that in an area of variable compression, the roll-off behavior of the dressing does not depend, or only slightly depends on the dressing compression.

The measured values required for determining or for forming the characteristic number are determined by use of a measuring device having two rollers. In an advantageous embodiment, the measuring device has a lever, which transmits the displacement movement for detecting the distance, or the change in the distance or draw-in. A greater lever ratio can be additionally achieved by use of an eccentric, which moves the cylinder, wherein the lever is rigidly connected with the bearing ring to be swiveled.

The characteristic number obtained for a particular dressing can be applied to the most diverse printing group configurations and is independent of the geometry of the measuring device used. Only the algebraic specification between the geometry and the characterization of the dressing must be defined and known.

The possibility of configuring a printing group, which is optimized in respect to its roll-off behavior, is also advantageous. For example, a transfer cylinder of double circumference can be embodied with a dressing with a characteristic number a of 0.989 to 0.999, while a transfer cylinder of single circumference with a dressing with a characteristic number $\alpha$ of 0.980 to 0.995 can be used, if it cooperates with a counter-pressure cylinder of substantially the same circumference. The cited characteristic numbers a must be observed for a relative compression, at least in a range relevant to actual use.

The embodiment of a printing group is particularly advantageous in the case of transfer and counter-pressure cylinders which are driven independently of each other. Motor loads, motor design and control outlay are minimized by this.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENTS

Figure 1:
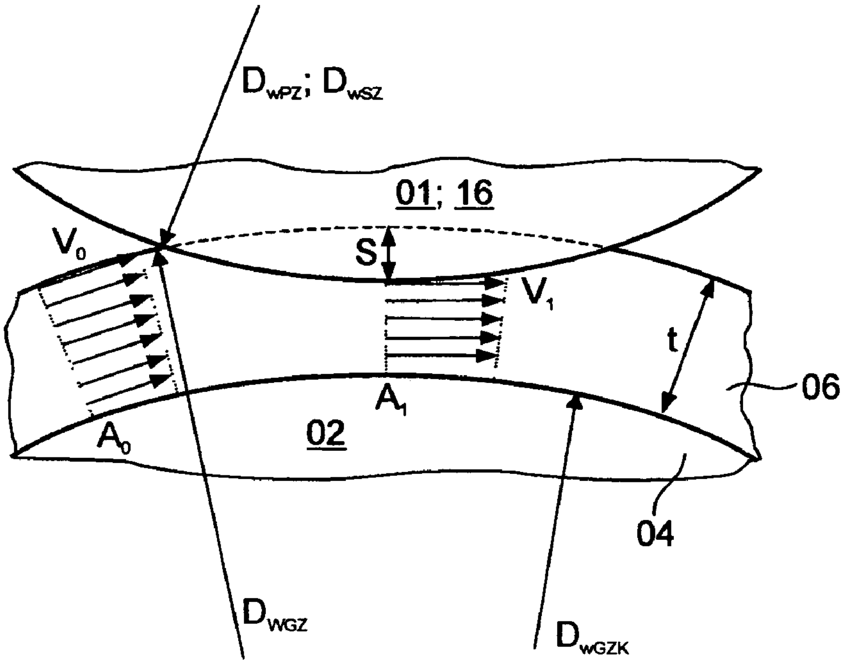
FIG. 1, a schematic depiction of the passage of a compressible rubber blanket through a roller gap, FIG. 2, a schematic depiction of the passage of an incompressible rubber blanket through the roller gap, FIG. 3, measured transmission ratios when varying the compression, FIG. 4, qualitative representation of the transmission ratios, FIG. 5, a first preferred embodiment of a print unit in accordance with the present invention, FIG. 6, a second preferred embodiment of a print unit, FIG. 7, a third preferred embodiment of a print unit, FIG. 8, a fourth preferred embodiment of a print unit, FIG. 9, a perspective view of a preferred embodiment of a measuring device for use with the present invention, and in FIG. 10, a detailed side elevation view of the measuring device in accordance with FIG. 9.

A machine, for example a printing press, has rollers 01, 02, which roll off on each other and form a roller gap 03 in the area of their contact with each other, as depicted in FIGS. 5–8. In the case of a printing press, these can be rollers 01, 02 of an inking unit, a coating unit, or cylinders 01, 02 of a printing group. In the preferred embodiment represented in FIGS. 1 and 2, the cylinders 01, 02 represent a forme cylinder 01 of an effective diameter of $D_{wPZ}$ and a transfer cylinder 02 of an offset printing group. One of the cylinders 01, 02, for example the transfer cylinder 02, has a soft elastomeric layer 06 of a thickness "t" on the surface of a mainly incompressible, inelastic core 04 of a diameter of $D_{wGZK}$. The inelastic core 04 and the elastomeric layer 06 together constitute an effective diameter $D_{wGZ}$ of the transfer cylinder 02. The forme cylinder effective diameter $D_{wPZ}$ is determined at the surface of the forme cylinder 01 which is effective during roll-off, and possibly includes a printing forme, which is not specifically represented, and which is placed on the surface of a base body. The cylinder 01 with the hard surface can also be embodied as a counter-pressure cylinder 01 that is cooperating with the transfer cylinder 02.

As a function of the mutual contact between the two cylinders 01, 02, i.e. as a function of their axial distance, the largely incompressible, inelastic surface of the forme cylinder 01 "dips" into the soft layer 06 of the transfer cylinder 02 and causes a compression S in the otherwise unaffected portion of the soft layer 06. This compression S results in the previously discussed problems in the roll-off of the two cylinders 01, 02, and depends on the properties of the material, such as the compressible and/or elastic behavior of the layer 06.

The present invention is based on the approach of making available a description of the characteristic or specific roll-off behavior of such a layer 06, which behavior is independent of the specific applications, or of particular measuring devices, by use of which characteristic or specific behavior, a suitable layer 06 can be selected, or a dimensioning of the rollers 01, 02 can be provided. Assuming an ideally compressible layer 06, for example a layer of cork or the like, and an ideally incompressible layer 06, for example a layer of solid rubber, the limits for the roll-off behavior can be set. The value for an actual layer 06 in the form of an inhomogeneous composite material consisting, for example, of a textile material, an air cushion layer, adhesive and rubber cover plate, i.e. including both compressible and incompressible components, lies within the above mentioned limit values.

The solution now consists in determining, or in defining, the relative position of the measured, or desired behavior with respect to the two theoretically determinable extreme behaviors of purely compressible, and purely incompressible layers.

An example for the analytic calculation of the idealized limit values will be provided in what follows. In the course of this discussion, the conveying velocity of the layer 06 in the roller gap 03 is examined for both ideal limit values.

In the ideally compressible case, the compression S of the layer 06 in the roller gap 03 causes a condensing of the layer 06. The velocity $v_0$ at the undisturbed surface of the layer 06 is reduced in the contraction zone to the velocity $v_1$ because of a reduced effective diameter $D_{wGZ}$ of the transfer cylinder 02, as depicted in FIG. 1. The effective diameter $D_{wGZ}$ of cylinder 02 is reduced, in the area of the connecting line of both cylinder centers, by twice the amount of the compression S:

$$D_{wGZ}=D_{GZK}+2*(t-S) \quad [1]$$

For a number of revolutions or transmission ratio I expressing a lead and/or a lag from the numbers of revolutions $n_{GZ}$, $n_{PZ}$, or frequencies $w_{GZ}$, $w_{PZ}$ of the cylinders 01, 02

$$I=\frac{n_{GZ}}{n_{PZ}}=\frac{\omega_{GZ}}{\omega_{PZ}} \quad \text{wherein} \quad \omega=\frac{v}{r}=\frac{2*v}{D} \quad [2, 3]$$

in the compressible case with the surface velocity $v_p$ of the forme cylinder 01, the result is $$I_{komp} = \frac{2 * v_1 * D_{wPZ}}{D_{wGZ} * 2 * v_P} \quad [4]$$

In the case of "true rolling", i.e. where the two cylinders roll off freely on each other, the surface velocities $v_p$, $v_1$ of the two cylinders 01, 02 are equal. The slight slippage because of the bearing friction of the cylinder driven by friction is negligible. Thus, in the ideal compressible case, the transmission ratio can be represented as $$I_{komp} = \frac{\omega_{GZ}}{\omega_{PZ}} = \frac{D_{wPZ}}{D_{wGZ}} = \frac{D_{wPZ}}{D_{GZK} + 2 * (t - S)} \quad [5]$$

Figure 2:
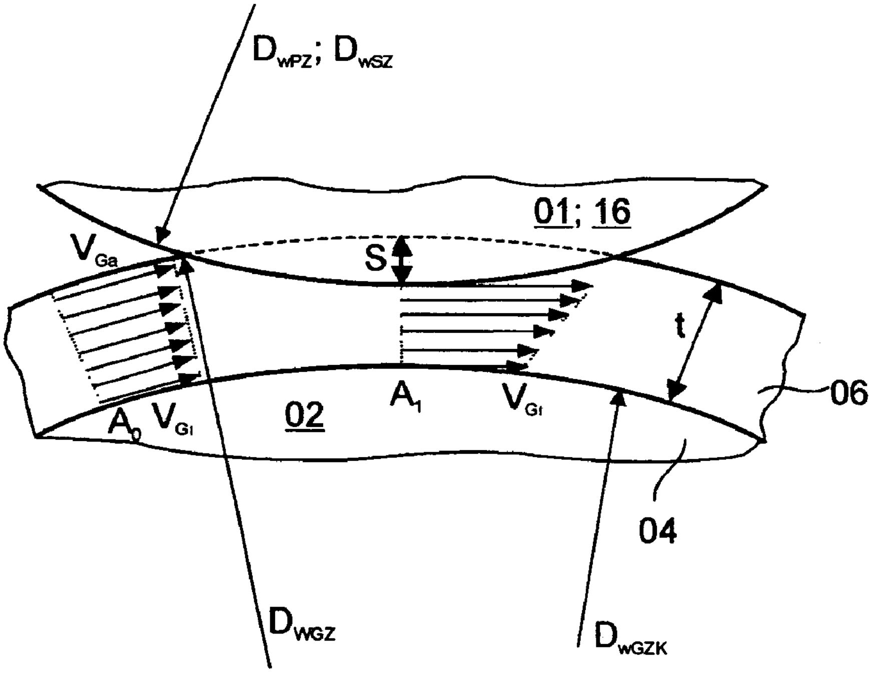

When conveying incompressible media through diametrical contractions, the continuation equation applies, which states that the mass throughput always remains constant. Applied to the compression S of the layer 06 in the print gap 03, this means an increase in the conveying velocity in the contraction, or contact zone of the cylinders 01, 02 rolling off on each other, as depicted in FIG. 2.

The mass throughput ahead of the roller gap 03, over a cross-sectional surface $A_0$, and in the contraction of the printing gap, over a cross-sectional surface $A_1$, is constant.

$$A_0 * v_0 = A_1 * V_1 \quad \text{(continuity) [6]}$$

The cross-sectional surfaces $A_0$, $A_1$ can be determined from a length L and the thickness t, or the thickness reduced by the compression S, t−S $$A_0 = L * t \; A_1 = L * (t - S) \quad [7]$$

Assuming a velocity profile, which is linear in the contraction zone, between a velocity on the inside $v_{Gi}$ and on the outside $v_{Ga}$ of the layer 06, and that the edge velocities are determined by the surface speeds of the cylinders 01, 02, the integration for the conveying velocity provides the mean velocity. Thus, the above presented continuity equation [6] can be written as follows:

$$t * \left(\frac{v_{Gi} + v_{Ga}}{2}\right) = (t - S) * \left(\frac{v_{Gi} + v_P}{2}\right)$$

Using the equation set forth at [3] for the circular frequency ω and several transformations, the following equation results as the number of revolutions or transmission ratio for the case of an incompressible limit:

$$I_{inkomp} = \frac{\omega_{GZ}}{\omega_{PZ}} = \frac{D_{wPZ} * (t - S)}{D_{GZK} * (t + S) + 2t^2} \quad [8]$$

Figure 3:
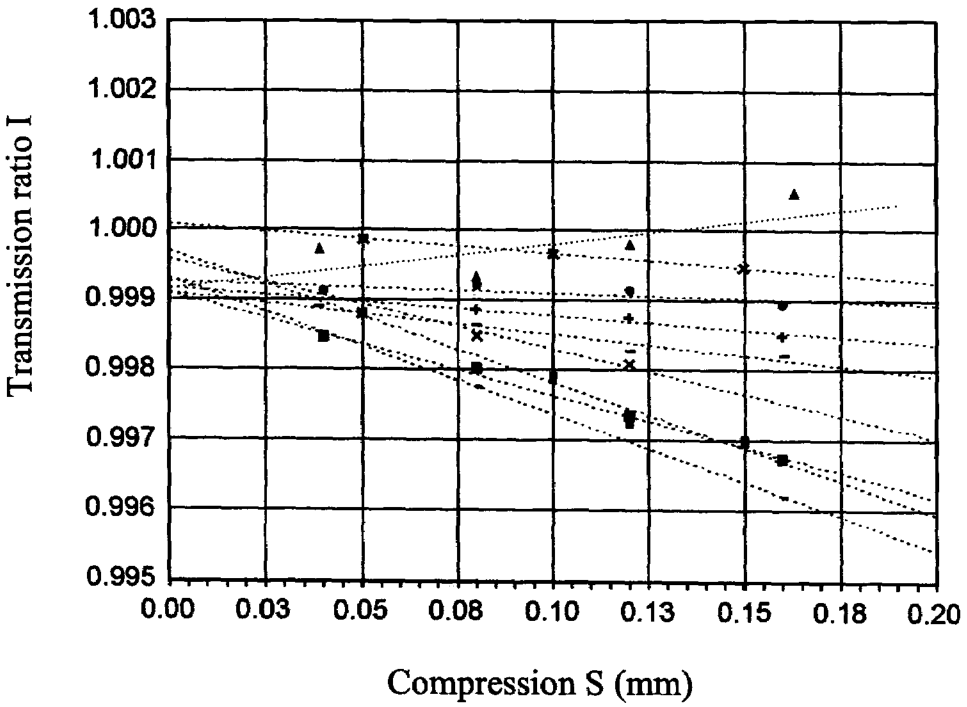

The transmission ratios for some measurements are represented in FIG. 3. For each layer 06, i.e. for several rubber blankets 06, the number of revolution ratios $n_{GZ}/n_{PZ}$ for four different compressions S were recorded and the transmission ratio I was calculated therefrom.

The connection of the measurement points results, in a good approximation, in straight lines, all of which start in the intersection point of the also entered limit cases. The partially recognizable offset from the intersection point has as its reason the different thicknesses t of the rubber blanket 06 used.

Figure 4:
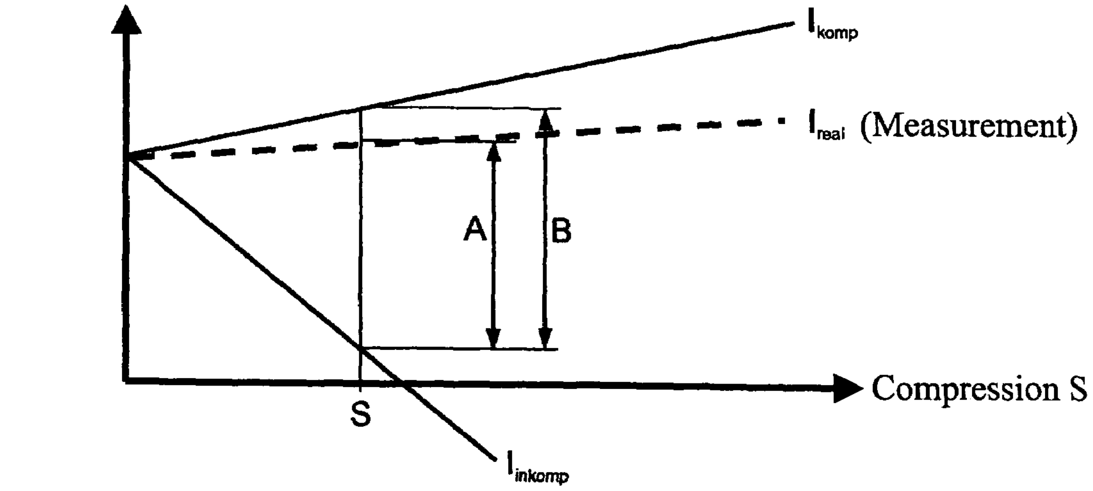

FIG. 4 shows the number of revolutions, or transmission ratios I in the ideally compressible, ideally incompressible and actual cases in a schematic representation.

For characterizing a layer 06, for example a rubber blanket 06, first a measurement for determining the ideal transmission ratio $I_{real}$ is performed by use of a suitable measuring device, as will be discussed subsequently, for at least one measurement point, a compression S. The geometries of the measuring device are known, so that by knowing the thickness "t", the theoretical transmission ratios I for the ideally compressible and ideally incompressible case are already known, or can be calculated. Now a characterizing number a is formed on the basis of a ratio, for example between the actually occurring transmission ratios I in the course of a measurement with an appropriate measuring device, and the idealized limit cases, each in connection with the same compression S. Based on ratios which were idealized and linearized at least in sections, the characterizing number a defined in this way for all compressions S, or at least for the considered area, is a constant, which objectively describes the roll-off behavior, either stretching or compression, of the layer 06. For example, the characterizing number a can be defined as follows:

$$\alpha = \frac{A}{B} = \frac{I_{real} - I_{inkomp}}{I_{komp} - I_{inkomp}} \quad [9]$$

wherein A represents the difference between the actual and the theoretically incompressible transmission ratio I, and B represents the difference between the theoretically compressible and theoretically incompressible transmission ratio I, each for the same compression S. In the definition of the characterizing number a in accordance with formula [9], α=0 in the case of an actual layer 06 behaving in an ideally incompressible manner, and α=1 in the case of an actual layer 06 behaving in an ideally compressible manner.

The characterizing number a can also be formed by use of a different type of algebraic specification, which describes the relative position of the measured actual transmission ratios I to the position of the extreme, theoretically determinable transmission ratios I. Thus it is possible to select a different standardization, for example by the use of multipliers, a spread of the value range, or a displacement by addition/subtraction. The differences in the quotients can also be reversed, or the numerator and denominator can be interchanged. However, the algebraic specification set forth previously at equation [9], which is the basis for knowing the characterizing number α, is essential in order to arrive, from an appropriately characterized rubber blanket 06, at the suitable configuration of the cylinders 01, 02, or from the configuration of the cylinders 01, 02 at the suitable rubber blanket 06.

In the place of number of revolution ratios I, it is also possible to employ leads or lags, ratios of angular speeds, or other comparable values describing a lead or lag, and by matching the specifications accordingly.

In the method for determining a characterizing number α, which characterizes the layer 06, which is corrected for the geometry of the measuring device, and which is constant at least in sections, first the conveying behavior is measured, for example by utilization of the resultant transmission ratio $I_{real}$, as a function of the compression S, and the position of this measurement point, or of several measurement points in relation to the corresponding extreme points, which can be theoretically determined for the measuring device, is determined. To this end, the measured and theoretically determined transmission ratios $I_{real}$, $I_{komp}$, $I_{inkomp}$ will be compared with each other, at least in sections, in particular in accordance with the algebraic relationship set forth above at [9]. In the simplest case, the characterizing number α for a compression S can be determined with the use of a single measured value.

In the reverse manner, it is possible to calculate, in advance, the transmission ratio I of the cylinders 01, 02, or a slippage to be expected for the respective compression S, for a rubber blanket 06 by use of the known characterizing number α, for example measured by the manufacturer, the associated algebraic specification, as well as the known cylinder geometries, such as diameters $D_{GZK}$, $D_{wPZ}$. In accordance with the algebraic expression [9], the following applies:

$$I_{real}=\alpha^*(I_{komp}-)+I_{inkomp} \quad [10]$$

Thus, the characterizing number a makes possible the quantification of the effective diameter $D_{wGZ}$ of the transfer cylinder 02 in connection with a defined compression S, and therefore, in the case of an angularly synchronous running of the cylinders 01, 02, also makes possible a calculation of the occurring slippage.

In a method for laying out the cylinders 01, 02, the diameter $D_{wPZ}$, $D_{GZK}$ of one of the cylinders 01, 02 is determined on the basis of the known characterizing number α, which is constant over at least sections, for the proposed layer 06 of a thickness t, and with the preset format, diameter $D_{GZK}$, $D_{wPZ}$ of the other cylinder 02, 01, for example to avoid slippage or unnecessary power output in the drive mechanism. It is thus possible, for example, to determine the required diameter $D_{GZK}$ of the core 03, or the entire diameter $D_{wGZK}$+2t of the transfer cylinder 02, for a rubber blanket 06 of a known characteristic number α, a desired course such as of vertical height and slope in the diagram, of the transmission ratio I and compression S, as well as with the known diameter $D_{wPZ}$, for example of the forme cylinder 01.

In this way, the roll-off, or the deformation behavior of the layer 06, such as rubber blanket 06, sleeve, metallic print blanket, coating/dressing/shell of a inking roller, described by the characteristic number α, can be included in the selection of the diameters $D_{GZK}$, $D_{wGZ}$, $D_{wPZ}$ for the ideal roll-off. By utilization of the characteristic number a for a given rubber blanket 06, it is possible to lay out the diameters $D_{GZK}$, $D_{wGZ}$, $D_{wPZ}$ in such a way that an optimal roll-off is achieved. In a further development, the diameters $D_{GZK}$, $D_{wGZ}$, $D_{wPZ}$ can also be optimized in such a way that the deviation from the ideal roll-off becomes minimal for a spectrum of different rubber blankets 06. For the use of different rubber blankets 06, or for the use of a special rubber blanket 06 in an already existing printing group, it is possible, prior to printing, to determine the number or the thickness of pads between the surface and the rubber blanket 06 for matching the diameter $D_{GZK}$, and to take it into consideration during set-up.

In the reverse way, it is possible, in a method to select a suitable layer 06, for example a rubber blanket 06, on the basis of predetermined printing group geometries, such as diameter $D_{GZG}$, $D_{wPZ}$[)], that initially extreme cases of the conveying behavior as a function of the compression S are determined algebraically, then a desired course, such as slope, or vertical height of the diagram for the conveying behavior of an actual layer 06 is determined at least in sections, and subsequently the characterizing number α, corrected for the specific geometry, of the required layer 06, for example a rubber blanket 06, is formed in that a relative position of the desired course, or of a value in respect to the algebraically determined values or courses, is determined at least for one value of the compression S.

It is now possible to select a rubber blanket 06 with an appropriate characterizing number α, provided the latter was formed on the basis of the same algebraic specification for the description of the relative position. If different algebraic specifications were used for the measurement and for the determination of the characterizing number α at the rubber blanket 06, and for the determination of the desired characterizing number α on the basis of the geometry of the cylinders 01, 02, these can be converted into each other when the specifications are known.

By changing the cylinder geometry, the straight lines of the theoretically determined transmission ratios $I_{komp}$, $I_{inkomp}$ are "tilted" in such a way, and the intersection point with the I axis is displaced, that with a fixed characterizing number α for a retained rubber blanket 06 the absolute position of the straight line for the actual transmission ratio $I_{real}$ is changed, while the relative position is retained.

With a change of the characterizing number α, as a result of a section of a rubber blanket 06 with different characteristics, but with the same cylinder geometries in the printing group, the straight lines of the theoretically determined transmission ratios $I_{komp}$, $I_{inkomp}$ are retained, but the relative one for the actual transmission ratio $I_{real}$ is tilted and has a different slope.

Thus, a dressing 06 with a characteristic number α matching a defined printing group geometry in general does not fit a printing group geometry which differs therefrom, in particular a different ratio of the diameters $D_{GZK}$, $D_{wPZ}$.

In an advantageous embodiment, with a roll-off which is largely independent of position, the dressing 06 and the printing group geometry are matched to each other in such a way that in at least a range which is relevant to actual operations of the compression S, or a relative compression S*, the slope in FIG. 4 between the transmission ratio $I_{real}$ and compression S is substantially zero, i.e. $dI_{real}/dS=0$. Here, the relative compression S* is defined by the ratio S/t, i.e. the compression S in relation to the original, non-compressed thickness t of the layer 06. Generally considered, a corresponding range for the relative compression S* can lie between 6% and 10%, and in particular between 6.5% and 9%, for example. However, it can be advantageous for differentiating between the "types" of nips. For the nip between a transfer cylinder 02, 11, and a forme cylinder 01, 12, the range relevant for actual operations lies between 6% and 7%, for example, while for a nip between a transfer cylinder 02, 11 and a satellite cylinder 16 it lies between 9% and 10%. The amount of the slope $dI_{real}/dS$ in these ranges should be at least less than or equal to 0.01 1/mm, and in particular should be less than or equal to 0.005 1/mm. For an advantageous type of dressings, the thickness t considered lies at 1.6 to 2.5 mm, for example, while for a second advantageous type of lesser resilient force, or surface pressure, and/or a lesser slope of a characteristic spring line i.e. a ratio of surface pressure/compression, the thickness lies at 3.5 to 5 mm, for example.

The printing groups, or print units, represented in FIGS. 5 to 8 are all linearly represented for the sake of simplicity, i.e. the axes of rotation of the involved cylinders are all on one plane in the representations. However, the cylinders of the printing groups can also be arranged at an angle in respect to each other. The following explanations apply in the same way to linear, as well as to angular arrangements of cylinders, or cylinder groups.

Figure 5:
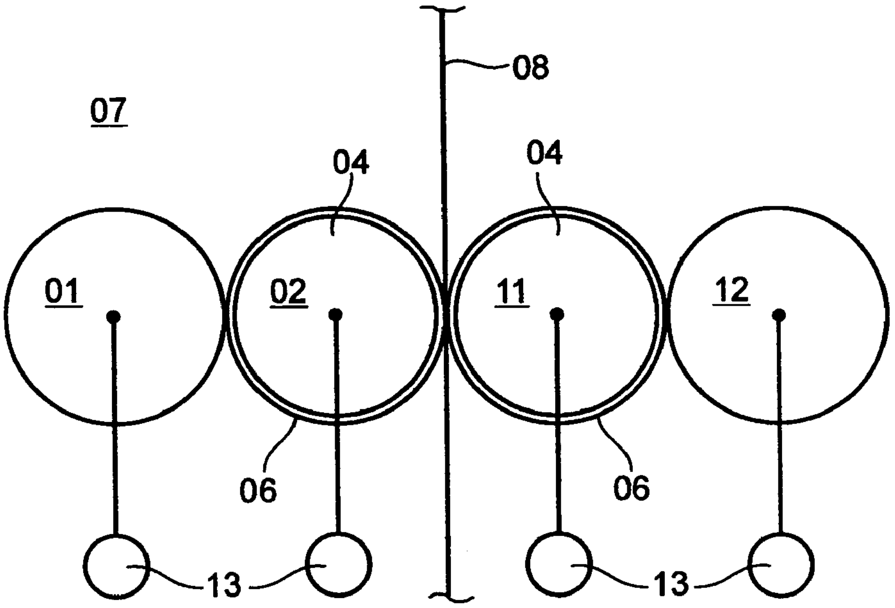
Figure 6:
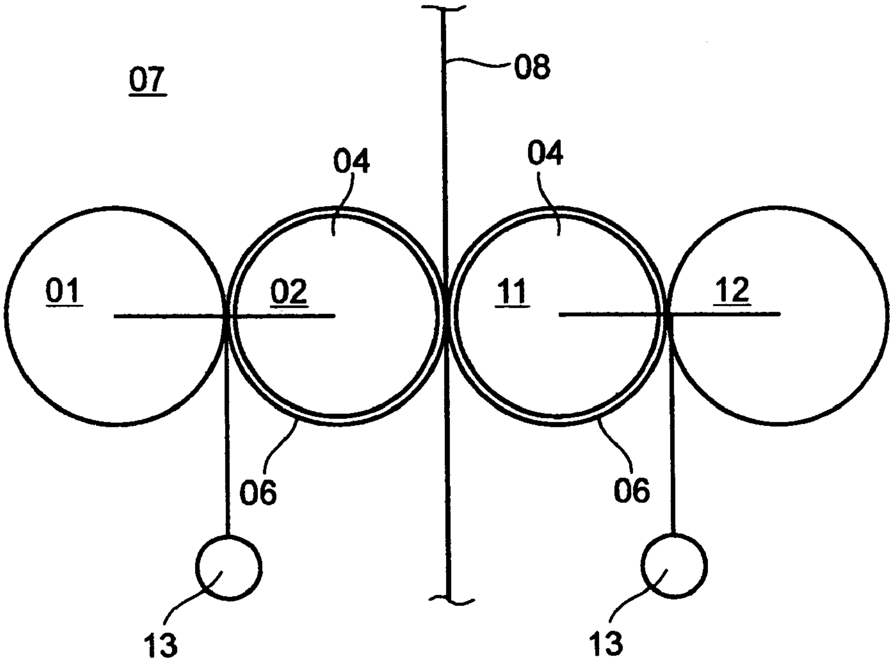

An advantageously configured print unit 07, which is embodied as a so-called double printing group 07, is represented in FIGS. 5 and 6. The transfer cylinder 02, assigned to the forme cylinder 01, of a first pair of cylinders 01, 02 cooperates via a material 08 to be imprinted, for example a web 08, with a counter-pressure cylinder 11, which may also be embodied as a transfer cylinder 11, to which a forme cylinder 12 has also been assigned. All four cylinders 01, 02, 11, 12 depicted in FIG. 5 are mechanically driven by different drive motors 13 independently of each other. In a modification shown in FIG. 6, the forme and transfer cylinders 01, 02, 11, 12, respectively coupled in pairs with each other, are driven by paired drive motors 13 with the cylinders being paired to a drive motor at the forme cylinder 01, 12, at the transfer cylinder 02, 11, or parallel.

In a first embodiment, the forme cylinders 01, 12 and the transfer cylinders 02, 11 are all embodied as cylinders 01, 02, 11, 12 of double circumference, with a circumference of essentially two vertical printed pages, in particular two newspaper pages. They are embodied with effective diameters $D_{wGZ}$ and $D_{wPZ}$ between 260 and 400 mm, and in particular between 280 to 350 mm. The transfer cylinder 02, 11 has at least one dressing 06 of a characterizing number $\alpha$ of 0.989 to 1.000, for example 0.989 to 0.999, on the surface of the core 04. By this configuration, a largely slippage-free roll-off, or drive, of the cylinders 01, 02, 11, 12, largely without a moment transfer, is assured. The number of revolutions ratio $I_{real}$ is preferably selected in such a way, that in case of a variation of the compression S, or the relative compression S*, at least within the above mentioned ranges for the relative compression S* of the appropriate cylinder pairing, it deviates by maximally 0.002, and in particular by 0.001, from 1.000/n. In this connection, the variable "n" represents the ratio between the number of printed pages in the circumferential direction on the transfer cylinder 02, 11 to the number of printed pages of equal size in the circumferential direction of the forme cylinder 01, 12. Since, in this embodiment, the cylinders 01, 02, 11, 12 have a double circumference, n=1 applies, and the deviation is maximally 0.002, and in particular is 0.001, from 1.000.

In a second embodiment, the forme cylinders 01, 12 and the transfer cylinders 02, 11 are embodied as cylinders 01, 02, 11, 12 of a single circumference, i.e. with a circumference of essentially one vertical printed page, in particular a newspaper page. They are embodied with effective diameters $D_{wGZ}$ and $D_{wPZ}$ between 150 and 200 mm. The transfer cylinder 02, 11 has at least one dressing 06 of a characterizing number $\alpha$ of 0.989 to 1.000, for example 0.980 to 0.995, on the surface of the core 04. Again, the number of revolutions ratio $I_{real}$ is preferably selected in such a way that in case of a variation of the compression S, or of the relative compression S*, at least within the above mentioned range for the relative compression S*, of the appropriate cylinder pairing, it deviates by maximally 0.002, and in particular by 0.001, from 1.000/n, i.e. 0.002, and in particular 0.001, from 1.000.

In a third embodiment, which is not specifically represented, the forme cylinders 01, 12 are embodied as cylinders 01, 12 of single circumference with effective diameters $D_{wPZ}$ between 150 and 190 mm, and the transfer cylinders 02, 11 are embodied as cylinders 02, 11 of double circumference with effective diameters $D_{wGZ}$ between 260 and 400 mm, and in particular between 280 to 350 mm. The transfer cylinder 02, 11 has at least one dressing 06 with a characterizing number a of 0.987 to 1.000, and in particular of 0.997 to 1.000. The number of revolutions ratio $I_{real}$ is again preferably selected in such a way that, in case of a variation of the compression S, or of the relative compression S*, at least within the above mentioned range for the relative compression S*, of the appropriate cylinder pairing, it deviates by maximally 0.002, and in particular by 0.001, from 1.000/n, thus with n=2, i.e. 0.002, and in particular 0.001, from 0.500.

Figure 7:
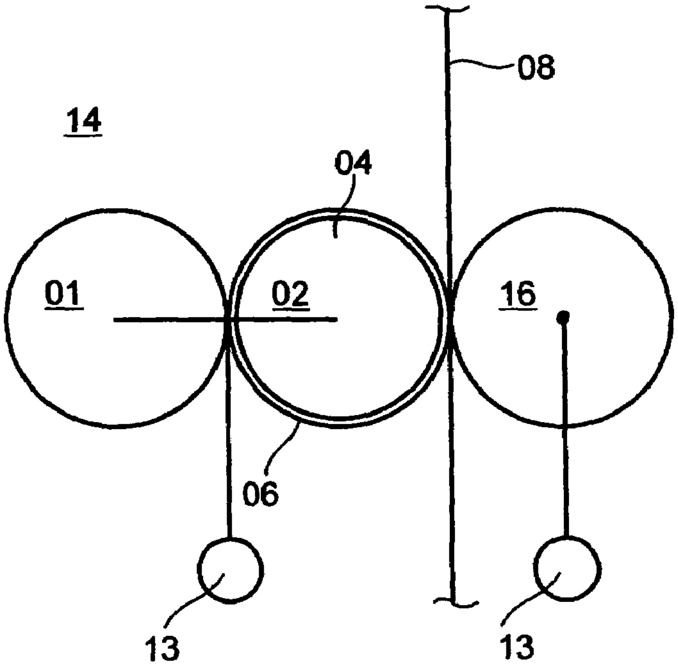
Figure 8:
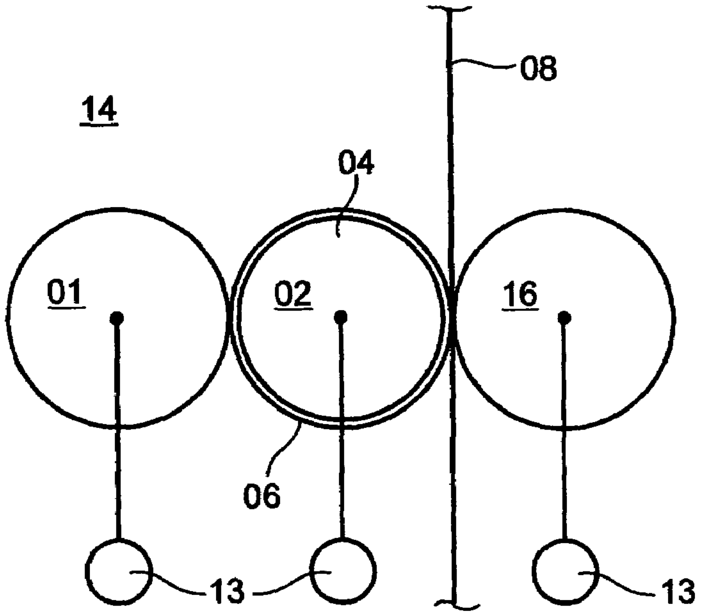

A printing group 14 is represented in FIGS. 7 and 8, which is either a part of a larger print unit, such as a five-cylinder, a nine-cylinder or a ten-cylinder print unit, or which can be operated as a three-cylinder print unit 14. In this case, the transfer cylinder 02 cooperates with a cylinder 16 without ink, for example a counter-pressure cylinder 16, and in particular a satellite cylinder 16. The "soft" surface of the transfer cylinder 02 now cooperates with the "hard" surface of the forme cylinder 01 on one side, and with the "hard" surface of the satellite cylinder 16 on the other side. The effective diameter $D_{wPZ}$ used for the forme cylinder 01 must be correspondingly replaced in the equations for the cooperation between the transfer and satellite cylinders 16 by the diameter $D_{wSZ}$ of the satellite cylinder 16. In one embodiment shown in FIG. 7, with a transfer cylinder 02 and a satellite cylinder 16 at least driven independently of each other, the one or several satellite cylinders 16 have their own drive motor 13, while the pair consisting of the forme and transfer cylinders 01, 02, which are mechanically coupled, are driven by a common drive motor 13, as shown in FIG. 7, or each is driven by its own drive motor 13 in a manner where they are mechanically independent of each other, as shown in FIG. 8.

In a first embodiment in FIG. 7, the forme cylinder 01, the transfer cylinder 02 and the satellite cylinder 16 are embodied as cylinders of double circumference with effective diameters $D_{wGZ}$, $D_{wPZ}$ between 260 and 400 mm, and in particular between 280 to 350 mm. The transfer cylinder 02 has at least one dressing with a characterizing number $\alpha$ of 0.990 to 0.999, and in particular of 0.993 to 0.997. A largely slippage-free roll-off, or a drive of the cylinders 01, 02, 16 largely without a moment transfer, is assured by this configuration.

In a second embodiment for FIG. 7 or 8, the forme cylinder 01, transfer cylinder 02 and satellite cylinder 16, are embodied as cylinders 01, 02, 16 of simple diameter, i.e. with a circumference of substantially one vertical printed page, in particular a newspaper page. They are embodied with effective diameters $D_{wGZ}$, $D_{wPZ}$ between 120 and 180 mm, and in particular between 130 to 170 mm. The transfer cylinder 02 has at least one dressing with a characterizing number a of 0.990 to 0.999, and in particular of 0.993 to 0.997.

In a third embodiment, which is not specifically represented, for FIG. 7 or 8, the forme cylinder 01 is embodied as a cylinder 01 of single circumference with an effective diameter $D_{wPZ}$ between 120 and 180 mm, and in particular between 130 to 170 mm, and the transfer cylinder 02, as well as the satellite cylinder 16 as cylinders 02, 16 of double circumference with effective diameters $D_{wGZ}$, $D_{wSZ}$ between 260 mm and 350 mm, and in particular between 280 mm and 320 mm. The transfer cylinder 02, 11 has at least one dressing 06 with a characterizing number $\alpha$ of 0.985 to 0.995, and in particular between 0.990 to 0.995, on the surface of the core 04.

In a fourth embodiment, which is also not specifically represented, for FIG. 7 or 8, the forme cylinder 01 and the transfer cylinder 02 are embodied as cylinders 01, 02 with effective diameters $D_{wPZ}$, $D_{wGZ}$ between 120 and 180 mm, and in particular between 130 to 170 mm, and the satellite cylinder 16 as cylinder 02, 16 of double circumference with effective diameters $D_{wGZ}$, $D_{wSZ}$ between 260 mm and 350 mm, and in particular between 280 mm and 320 mm. The transfer cylinder 02, 11 has at least one dressing 06 with a characterizing number a of 0.985 to 0.995, and in particular between 0.990 to 0.995, on the surface of the core 04. If the forme and the satellite cylinders 01, 16 are of different sizes, it is only possible to find an ideal compromise for the case in accordance with the requirements in the two nips.

As already explained above, the characterizing number $\alpha$ of a dressing 06 is determined by a measurement using a suitable device and by subsequent processing by use of an algorithm. A preferred embodiment of a measuring device, such as is particularly suitable for determining the characterizing number $\alpha$, is represented in a top perspective view in FIG. 9, and in an enlarged side elevation view in FIG. 10.

The measuring device has at least two cylinders 17, 18, or rollers 17, 18, which are rotatably seated, in particular on both ends, in a frame 19. At least one of the two cylinders 17, 18, in this case the cylinder 17, has a largely incompressible and inelastic hard surface. At least one of the cylinders 17, 18 is seated in such a way that an axial distance “a” between the axes of rotation of the two cylinders 17, 18 can be changed. In the preferred embodiment, the cylinder 17, which is embodied with a “hard” surface and which corresponds to the forme or satellite cylinder 01, 02, 16, is seated with its ends, by use of a journal, in an eccentric bushing 21 of the frame 19. In the example, the other cylinder 18 is seated fixed in place in the usual manner in the frame 19. The seating of the cylinders 17, 18 is embodied to be rigid and free of play. For the former, the bearings are embodied solidly in an appropriate way. The freedom from play is provided either by a conical seating of the bearing, or by thermally shrinking it on. However, the soft cylinder 18 can also be movably seated and the hard cylinder 17 seated fixed in place, or both cylinder 17, 19 can be movably seated. The movability can possibly also be provided by use of a pivoting lever or by a cylinder 17, 18 seated in a linear guide.

In an advantageous embodiment, the eccentric bushing 21 has an eccentricity “e” of twice, or of four times, the thickness “t” of the layer 06 to be customarily measured by use of the device (n2*t to 4*t), which, for example, lies between 3 and 8 mm, and in particular lies between 4 and 6 mm for one type of layers 06, and between 8 to 16 mm, and in particular between 10 and 14 mm, for a thicker type. In a base position, the position of the eccentricity “e” forms an angle $\gamma$ gamma of 75 to 120°, and in particular of 85 to 110°, with a plane E. In this case, the base position is considered to be that position of the cylinders 17, 18 in respect to each other, in which a linear contact of the two surfaces just takes place, substantially without a compression S.

In an advantageous embodiment, the twisting of the eccentric bushing 21 is performed via a lever 22, which is rigidly connected with the eccentric bushing 21 and which lever 22 is pivotable by operation of an actuator 23 around the pivot axis of the eccentric bushing. In principle, the actuator 23 can be differently designed, for example as a motor-driven threaded spindle. In the depicted embodiment, the actuator 23 is embodied as a cylinder 23, which can be charged by a pressure medium and which is hingedly arranged on the frame 19, while its piston rod 24 is hingedly connected with the lever 22 or vice versa.

The actuator 23 pivots the lever 22 against a detent 26, which limits the pivotal movement of the eccentric bushing 21 to shorter axial distances “a” of the cylinders 17, 18. This detent 26 is embodied to be adjustable in the direction of the travel limitation of the lever 22, but can be fixed in place in a desired position in respect to the frame 19. In the example, a threaded bolt 27, for example a threaded spindle or a screw with a fine-pitch thread, has the detent 26 on its front face. By turning the threaded bolt 27 manually, or by a motor, the detent 26 can be moved further in the direction toward the lever 22 or away from it.

In an advantageous embodiment, the movement, or the position of the eccentric bushing 21, or of the lever 22, is determined by the operation of a path-measuring device 28. In the present example, the measurement is performed by a dial gauge 28 which is fixed in place on the frame, and whose free and movable pin cooperates with the lever 22. The arrangement of a dial gauge 22 is advantageous, wherein one revolution of the pointer corresponds to a linear movement of the pin of less than 0.05 mm, and in particular of less than or equal to 0.02 mm. The path-measuring device 28 can, however, be embodied to be an electrical and/or a magnetic device instead of a mechanical embodiment. In that case, the measured value can then be supplied to a data processing device, not specifically represented, either converted from a mechanical into an electrical signal, or as a directly obtained electrical signal.

An arrangement is advantageous for a high degree of measuring accuracy, wherein a distance “b” between the pivot shaft A and the measuring point of the path-measuring device, which is picked up at the lever 22, is large in respect to the eccentricity “e”. The ratio of the distance “b” and the eccentricity “e” is greater than or equal to 20 in an advantageous embodiment, and in particular is greater than or equal to 50. The movement of the cylinder 17 on its surface is defined by the eccentricity “e”, the distance “b”, the resolution of the path-measuring device and the known line for pivoting the axis of rotation. The measuring accuracy of a measuring device embodied in such a way has a reproducibility in the compression S of less than or equal to 0.005 mm.

In a further development, the detent 26 is embodied to be moved by a motor, wherein the position of the detent 26 is provided, or is preset, as an electrical signal. The measured value of the path-measuring device 28 is simultaneously available in the form of an electronic signal. In this embodiment, it is possible to automatically set one or several positions for the cylinder 17, or one or several axial distances “a”, via a data processing device, or control.

In a further embodiment, which is not specifically represented, the setting of the detent 26 and the path-measuring device 28 takes place via only one mechanism, such as a threaded spindle with a fine-pitch thread, and which is driven by an angularly-controllable electric motor. A data processing device receives information regarding the position of the detent 26 on the basis of the angular position of the threaded spindle, or vice versa.

For determining the compression zero point, i.e. the position in which there is merely a linear contact between the two cylinders 17, 18 without a compression S, the measuring device has, for example, one or several light sources, which are not specifically represented, on one side of the gap between the cylinders 17, 18. In the course of the approach of the two cylinders toward each other, it is thus possible to determine the compression zero point with the aid of the light gap as the time at which no more light falls through the gap. In manual operation, the light can be detected on the other side of the gap by the human eye, or during automatic operation it can be detected by one or more detectors, for example. In the course of the automatic operation, the signal is passed on to the data processing device, which is not represented. By the described use of light, it is possible to achieve an accuracy for adjusting the compression zero point of less than or equal to 0.005 mm, and in particular of less than or equal to 0.002 mm.

For detecting the roll-off behavior of the two cylinders 17, 18, one of the two cylinders 17, 18 can be rotatably driven by an external drive 29, for example by an electric motor 29. For example, the electric motor 29 in FIG. 9 drives, via a drive wheel 36, which may be, for example, a pulley 36, and a gear 37, which may be, for example, a belt 37, and in particular a toothed belt 37, a drive wheel 38, for example a pulley 38, secured to the hard cylinder 17, while the soft cylinder 18 is driven only by friction. However, the electric motor 29 can also drive the soft cylinder 18 by operation of the belt 37, for example, while the hard cylinder 17 is driven by friction. In an advantageous embodiment, the electric motor 29 can be alternately connected with the hard cylinder 17 or with the soft cylinder 18. In a further development, one of the cylinders 17, 18, or even both, have an electric motor 29, which drives them and which is positionally controlled or which is at least rpm-controlled. A negative effect on the roll-off behavior, because of one of the cylinders 17, 18 being driven by friction, is reduced by using bearings with extremely low friction. A maximum deviation in the measured transmission ratio I from the "true" transmission ratio I of maximally 0.01% can be achieved in this way.

The angular velocity, or the respective angle of rotation position of the two cylinders 17, 18 can be measured by use of rotary sensors 31, 32, for example opto-electronic angle decoders, respectively arranged at the cylinder 17, 18, or on an appropriate journal.

Figure 9:
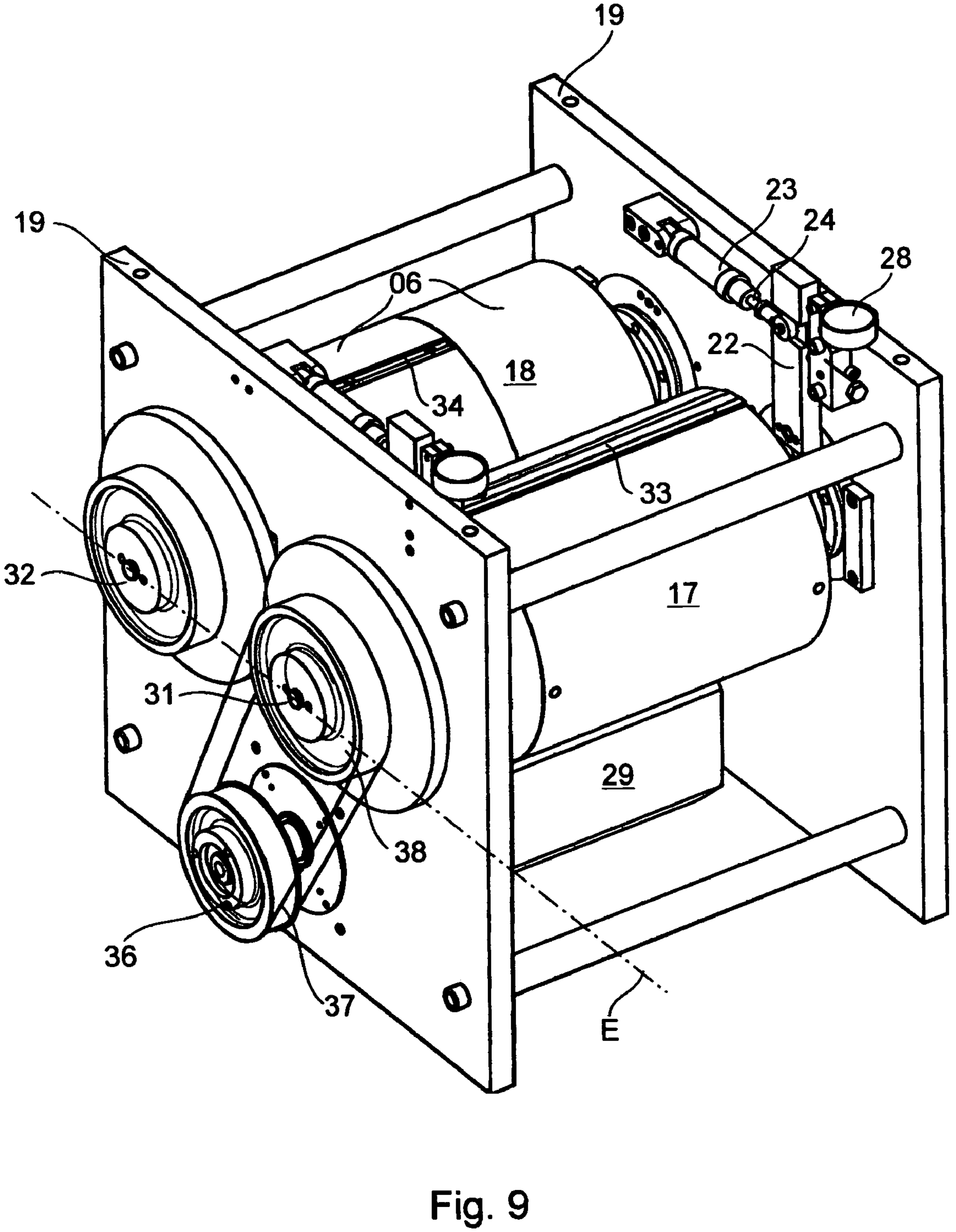
Figure 10:
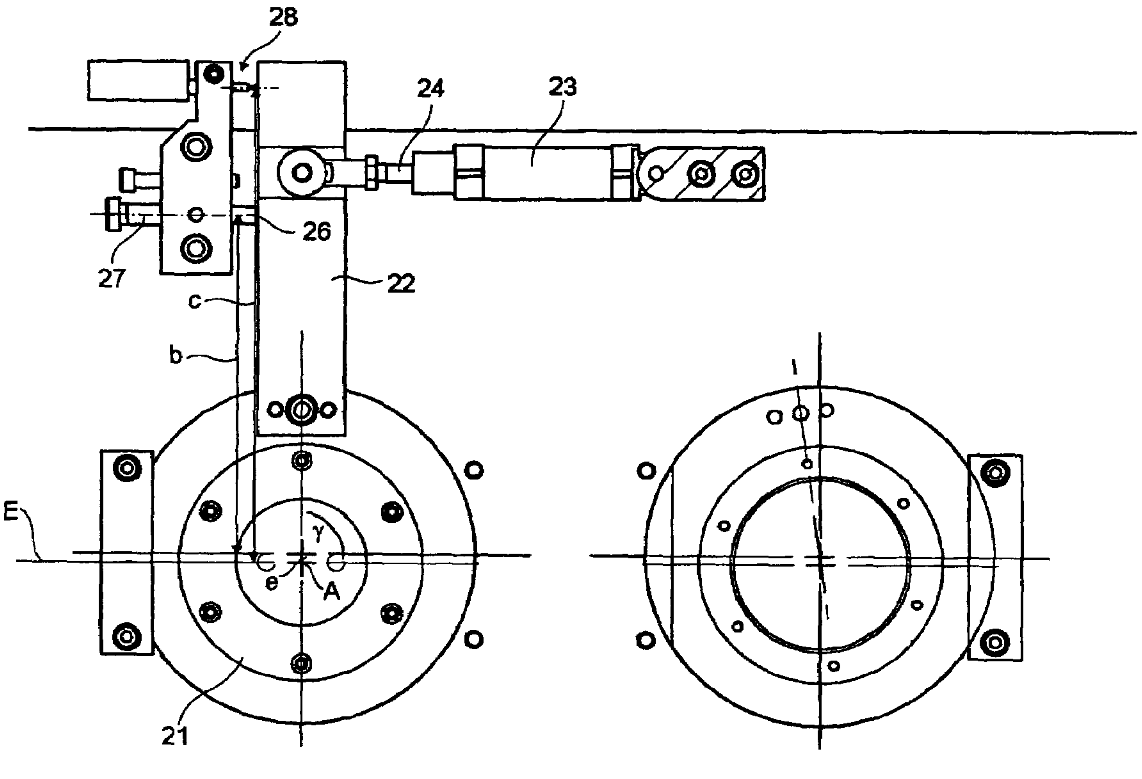

For preventing an interruption of the contact between the two cylinders 17, 18 rolling off on each other, the hard cylinder 17, in an advantageous manner, has a continuous uninterrupted surface in the area in which it rolls off on the soft cylinder 18. However, this can also be achieved in that "replacement printing formes", which are possibly located on the surface, are arranged offset from each other by, for example, 180° in the circumferential direction or, if the hard cylinder 17 only has a finite replacement printing forme, that the joint, or groove, being created is closed off flush with the surface by a cover 33, as seen in FIG. 9 for example. The same applies to the soft cylinder 18, wherein two dressings 06, which are offset in respect to each other by 180° in the circumferential direction, and a cover 34, maximally extending over half the cylinder length, are represented, by way of example, in FIG. 9. This arrangement of the dressings 06 assures a continuous contact of one of the dressings 06 with the hard cylinder 17.

The angular velocity of both cylinders 17, 18, and possible leads or lags in the cylinder velocities, are detected for different compressions S in a highly accurate manner by the rotary sensors 31, 32 and by a downstream-connected electronic device. Driving can be provided alternately by the hard or the soft cylinder. Now, for adjusting the axial distance "a", the moved cylinder 17 or 18 is displaced in its eccentric bushing in that the latter is twisted. The above explained displacement is, in particular, designed to be easier than with a printing press. The compression end point is now determined by the light gap between the surfaces for example by placement of a neon tube underneath the roller gap. By use of the sensitive adjustment provided by detent 26, the compression S is now exactly set and measured by the path-measuring device 28.

As described above, the characterizing number $\alpha$ is now determined for a compression S (for S>0) through knowledge of the geometries of the cylinders 17, 18, as well as the measuring point, or measuring points, by utilization of algebraic specifications, such as the equations [5], [8] and [9].

While methods and a device for characterization determination of a characterization number and selection of suitable dressings on cylinders of a printing press in accordance with the present invention have been set forth fully and completely hereinabove, it will be apparent to one of skill in the art that changes in, for example the particular nature of the web being printed, the specific drive motors and the like could be made without departing from the true spirit and scope of the present invention which is accordingly to be limited only by the following claims.

What is claimed is:

1. A method for selecting a layer on a roller including:

determining extreme values theoretically resulting for purely compressible and purely incompressible number of revolutions ratios as a function of a compression of said layer in a predetermined printing group geometry;

fixing a desired relative position for a number of revolutions ratio for said layer in respect to said extreme values; and forming a characterizing number by bringing into relation a desired course with theoretically determined courses of said extreme values using an algebraic specification correct for a specific geometry of said roller.

2. The method of claim 1 further providing a measuring device, using said measuring device for measuring said layer, forming said characterizing number using said algebraic specification and correcting said characterizing number for geometry of said measuring device using said algebraic specification.

3. The method of claim 1 further including using said algebraic specification for expressing a relative position of said measured number of revolutions ratio with respect to said extreme values of the number of revolutions ratio of said compression.

4. A method for determining a characterizing number characterizing a roll-off behavior of an elastic layer on a cylinder including:

providing a measuring device including a pair of rollers adapted to roll off on each other;

supporting the elastic layer on one of said pair of rollers;

measuring a number of revolutions ratio between said roller supporting said elastic layer and the other of said pair of rollers as a function of a compression of said elastic layer;

determining for said compression of said elastic layer extreme values of said number of revolutions ratio for a theoretically determined purely compressible revolution ratio and a theoretically determined purely incompressible revolution ratio; and bringing said measured number of revolutions ratio into a relationship with said theoretically determined purely compressible revolution ratio and said theoretically determined purely incompressible revolution ratio in accordance with an algebraic specification for forming said characterizing number corrected for geometry of said measuring device.

5. The method of claim 4 using said algebraic specification for expressing a relative position of said number of revolutions ratio with respect to said extreme values of said revolutions ratio for said compression of said elastic layer.

* * * * *